United States Patent [19]

Fullton, Jr.

[11] 3,795,864

[45] Mar. 5, 1974

[54] METHODS AND APPARATUS FOR GENERATING WALSH FUNCTIONS

[75] Inventor: James McFerrin Fullton, Jr., Chapel Hill, N.C.

[73] Assignee: Western Electric Company, Incorporated, New York, N.Y.

[22] Filed: Dec. 21, 1972

[21] Appl. No.: 317,340

[52] U.S. Cl. .................. 325/38 R, 178/68, 235/197, 179/15 BC, 340/348

[51] Int. Cl. ............................................. H04j 3/00

[58] Field of Search ........ 179/15 BC; 235/154, 197; 325/38 R; 340/348; 178/68

[56] References Cited

OTHER PUBLICATIONS

"On the Definition and Generation of Walsh Functions"–Anthony C. Davies, IEEE Transactions On Computers, Feb. 1972, pp. 187–189.

"Digital 325/38 R Fourier Analysis of Periodic Waveforms"–Karl–Hans Siemens and Reuven Kitai–IEEE Transactions on Instrumentation and Measurement, Dec. 1969, pp. 316–321.

"An Implementation Technique for Walsh Functions'-'–G. Robert Redinbo IEEE Transactions on Computers June, 1971, pp. 706–707.

*Primary Examiner*—Robert L. Griffin
*Assistant Examiner*—Marc E. Bookbinder
*Attorney, Agent, or Firm*—B. W. Sheffield

[57] ABSTRACT

Apparatus for generating digital signals which are representative of the Walsh functions. In a first embodiment, a selection register receives the row address of a given row in a Hadamard array which corresponds to the desired Walsh functions. A binary counter receives the column address at which generation of the Walsh function is to begin and the outputs of the register and counter are selectively "AND"ed and "OR"ed, according to a predetermined procedure, to generate the desired Walsh function.

21 Claims, 14 Drawing Figures

| COUNT | 0 | 1 | SELECT CODE |
|---|---|---|---|
| | 1 | 1 | 0 |
| | 1 | -1 | 1 |

| COUNT | 00 | 01 | 10 | 11 | SELECT CODE |
|---|---|---|---|---|---|
| | 1 | 1 | 1 | 1 | 00 |
| | 1 | -1 | 1 | -1 | 01 |
| | 1 | 1 | -1 | -1 | 10 |
| | 1 | -1 | -1 | 1 | 11 |

METHODS AND APPARATUS FOR GENERATING WALSH FUNCTIONS

BACKGROUND OF THE INVENTION

1. Field of the Invention

Broadly speaking, this invention relates to methods and apparatus for generating digital signals. More particularly, in a preferred embodiment, this invention relates to methods and apparatus for generating digital signals which are representative of the Walsh functions.

2. Discussion of the Prior Art

In 1923, the noted mathematician, J. L. Walsh, submitted a paper to the *American Journal of Mathematics* describing a newly discovered orthogonal set of bipolar, rectangular functions, now generally referred to as the Walsh functions.

Walsh functions contain features which, in many ways, are analogous to features possessed by the orthogonal set of trigonometric functions used to represent Fourier series. In fact, the Walsh transform is sometimes referred to as the binary Fourier transform.

Although little more than a mathematical curiosity when first reported, the development of extremely fast-switching, solid-state binary hardware has led to many practical uses for Walsh functions. For example, Walsh functions have successfully been employed for signal processing and multiplexing to accomplish such tasks as (a) signal detection or enhancement in the presence of noise, (b) signal sorting, and (c) signal parameter identification. See, for example, U. S. Pat. No. 3,204,035, which issued on Aug. 31, 1965 to A. H. Ballard et al. Other applications of Walsh functions result in better utilization of digital computers and in more efficient processing of digital signals. Further, the similarities between the Walsh function representation of a signal and the Fourier representation of the same signal make the Walsh functions a natural system to consider for band-width reduction, in view of the demonstrated efficiency of the Fourier representation for redundancy reduction.

U. S. Pat. No. 3,618,077, which issued on Nov. 2, 1971, in the name of H. L. Peterson, discloses a Walsh function generator which is capable of generating thousands of Walsh functions per second. Peterson's technique involves modifying binary input command signals in a way which allows forward copying about axes of symmetry of the Walsh functions, as localized in a shift register, the serial output of the register being the desired Walsh function. The apparatus disclosed in the above-referenced patent, however, is very complicated and expensive to manufacture. Further, the apparatus cannot begin generation of a selected Walsh function at any arbitrary point in the sequence but, rather, must generate each digit in the sequence, seriatim, starting with the first. See also U. S. Pat. No. 3,701,143 which issued on Aug. 24, 1970, in the name of George G. Nocht.

Another known way to generate Walsh functions is to synthesize the desired function from Walsh functions of lower order. This technique, however, suffers from the disadvantage that a computer, having a large memory capability, must be employed. Furthermore, the combining circuitry necessary to synthesize the desired functions is very complex.

The problem, then, is to discover a technique for generating Walsh functions which can be implemented in apparatus which is relatively uncomplicated and inexpensive to manufacture. The technique should allow generation of a function to begin at any arbitrary point within the sequence, and without the necessity of first generating lower order functions. It should also be possible for the generator to switch smoothly from function to function, that is to say, to perform the Walsh domain equivalent of coherent frequency hopping.

SUMMARY OF THE INVENTION

These, and other problems, have been solved by the instant invention which comprises, in a first embodiment, a method of generating the $K^{th}$ Walsh function of order $n$, where $n=2^p$, $p \geq 1$, and $0 \leq k \leq n-1$. The method comprises the steps of generating a first binary signal representative of the number $K$, and a second binary signal representative of a predetermined number $m$, where $0 \leq m \leq n-1$. Next, each bit in the first binary signal is compared with the corresponding bit in the second binary signal, thereby to generate a third binary signal, the third binary signal having a first signal condition in each bit position if the bits in the corresponding bit positions of the first and second binary signals are simultaneously "1" and a second signal condition, if otherwise. Next, the number of first signal conditions in the third binary signal are counted and a fourth binary signal is generated, comprising a third signal condition if the number of first signal conditions counted in the counting step is even, and a fourth signal condition, if otherwise; and then the above steps are reiterated, seriatim, for the numbers $m+1$, $m+2$, . . . , $n-1$, 0, . . . , $m-1$, the sequence of fourth binary signals so produced comprising the desired Walsh function.

A second embodiment of the invention comprises the step of generating a first $p$ bit binary signal representative of the number $K$, and a second p bit binary signal representative of a number $m$, where $0 \leq m \leq n-1$. Next, a third signal representative of a first binary signal condition is generated and for each of the $p$ bit positions in said $p$ bit binary signals, said third signal is sequentially complemented to cause the signal to become representative of a second binary signal condition, or the first binary signal condition, if the bits which occupy corresponding bit positions in the first and second binary signals both simultaneously comprise a third binary condition, but maintaining the third signal constant if otherwise, and then, reiterating the above steps, seriatim, for the numbers $m+1$, $m+2$, . . . , $n-1$, 0, 1, . . . , $m-1$, the sequence of sequentially complemented third signals so produced comprising the desired Walsh function.

To practice the first method above, another embodiment of the invention comprises an apparatus for generating the $K^{th}$ Walsh function of order $n$, where $n=2^p$, $p \geq 1$, $0 \leq K \leq n-1$. The apparatus includes means for supplying a first p bit binary signal representative of the number $K$, and means for supplying a second $p$ bit binary signal representative of a predetermined number $m$, where $0 \leq m \leq n-1$. The apparatus also includes means, connected to the first and second signal supplying means, for comparing each of the p bit positions in the first binary signal with a corresponding one of the $p$ bit positions in the second binary signal to generate a first binary signal condition for each such comparison wherein the corresponding bit positions both simultaneously comprise a second binary signal condition, and a third binary signal condition if otherwise, and means, connected to said comparing means, for counting the number of first binary signal conditions so generated and for generating a fourth binary signal condition if the count is even, and a sixth binary signal condition if otherwise. Lastly, the apparatus includes means, connected to the second signal supplying means, for causing the second signal to successively represent the numbers $m+1, m+2, \ldots, n-1, 0, 1, \ldots, m-1$, whereby the sequence of third and fourth binary signal conditions comprises the desired Walsh function.

To practice the second method listed above, yet another embodiment of the invention comprises $p$ cascaded, conditional-complementing stages, the output of each stage comprising the input to the immediately succeeding stage, and means for supplying a first binary signal condition to the input of the first conditional-complementing stage, the output from the last such stage comprising the desired Walsh function. This second apparatus further includes means for supplying a first p bit binary signal representative of the number K to the conditional-complementing stages, the least significant through most significant bits of the signal being respectively connected to the first through last ones of the conditional-complementing stages, and means for supplying a second $p$ bit binary signal to the conditional-complementing stages, this signal being representative of a predetermined number $m$, where $0 \leq m \leq n-1$, the least significant through most significant bits of the signal being respectively connected to the first through last ones of the stages, each stage complementing the signal applied to the input thereof if the corresponding bits from the first and second signal supplying means both simultaneously comprise a second binary signal condition. Finally, the apparatus includes means, connected to the second signal supplying means, for incrementing the second binary signal so that it successively represents the numbers $m+1, m+2, \ldots, n-1, 0, 1, \ldots, m-1$, whereby the output from the last one of said complementing stages comprises a desired Walsh function.

Yet another embodiment of the invention, which may employ either of the methods listed above, comprises a transmission system for transmitting intelligence signals from a first to a second location. The system comprises, at the first location, means for periodically sampling the analog signal to be transmitted to the second location, at a predetermined rate, and means for converting each such sample into a digital signal. Additional equipment at the first location comprises computing means for generating an n term Walsh transform representative of each set of $n$ samples, and for selecting the K largest of the $n$ terms, and means for transmitting to the second location a signal which is representative of the magnitude and Walsh function number of each of the $K$ terms in each of the periodic samples. At the second location, the system includes means for recovering the signals transmitted by the transmitting means at the first location, and a shift register connected to the receiving means for temporarily storing the signals, as received, until a signal representative of a complete set of samples has been stored. In addition, the second location has K Walsh function generators connected to the shift register for generating $K$ Walsh functions in accordance with the signals representative of the Walsh function numbers of each of said K terms transmitted from said first location, K converter stages connected to corresponding ones of the K Walsh function generators, and to the shift register, for amplifying the outputs of the Walsh function generators in accordance with the signals representative of the magnitude of each of the K transforms transmitted from the first location and for converting the amplified Walsh functions into analog form, and means for summing the outputs of each of the K converter stages, thereby to substantially reconstruct each of said sample sets.

The invention will be more fully comprehended from the following detailed description, when taken in conjunction with the drawings, in which:

DETAILED DESCRIPTION OF THE INVENTION

Figure 1:
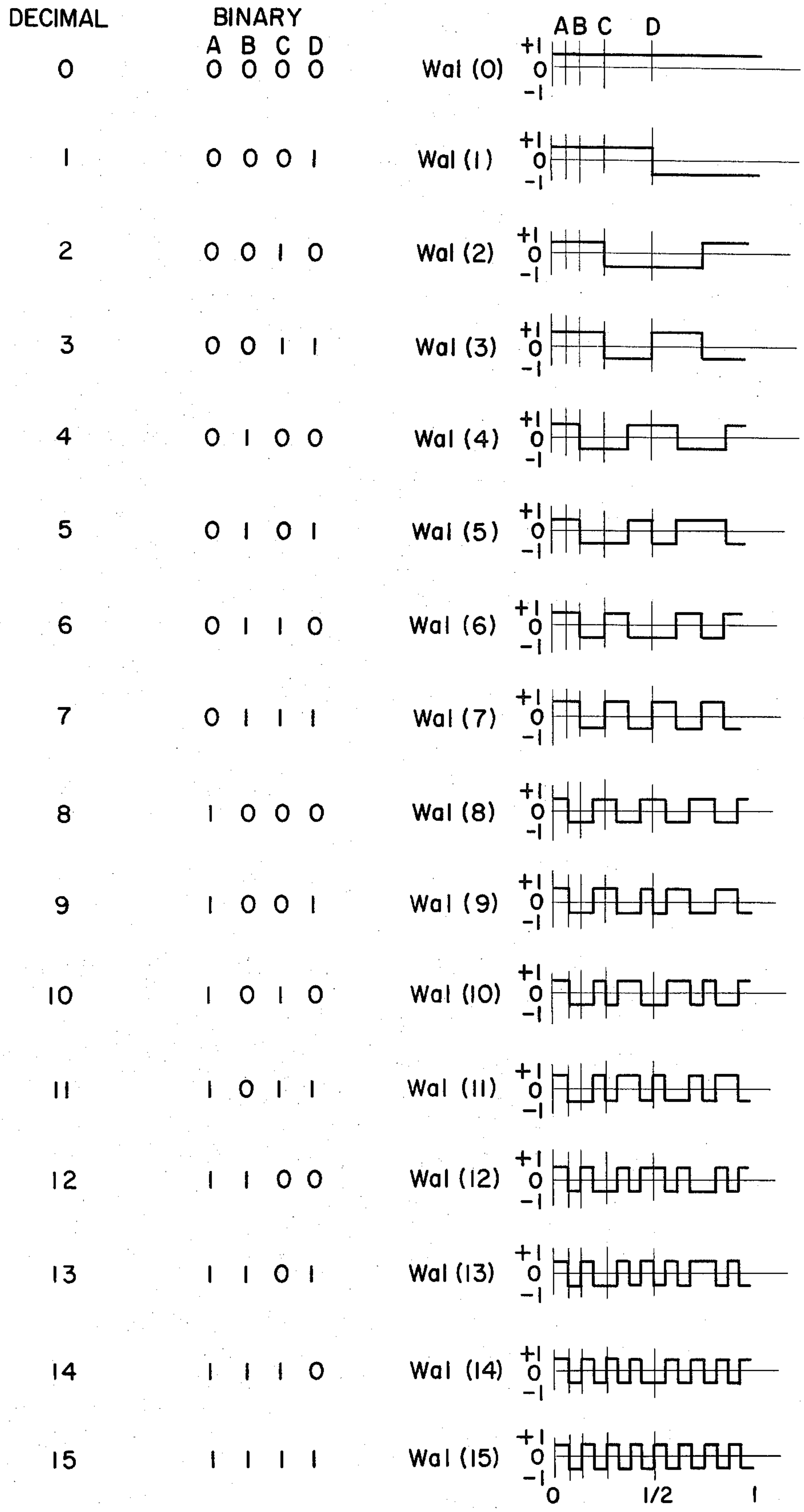
FIG. 1 depicts the Walsh functions of order 16.

As previously discussed, the Walsh functions are an orthogonal set of bipolar, rectangular functions having values of + 1 or − 1 over the range in which the functions exist. FIG. 1 depicts the Walsh functions of order 16. Specifically, from left to right, FIG. 1 depicts the decimal numbers 0–15, the equivalent binary numbers 0000–1111, and the first 16 Walsh functions, Wal(0) –Wal(15), respectively corresponding to these numbers.

It will be noted that Walsh functions possess several interesting features. First, for each Walsh function, Wal(n), the plot of the function crosses the zero axis $n$ times in the period 0 to 1 for which the functions are orthogonally defined. Thus, Wal(0) crosses the zero axis no times, Wal(1) crosses the zero axis one time, Wal (2) crosses the zero axis two times, and so on. This property of the Walsh functions results in the commonly used units for measuring a Walsh function, i.e., the "sequency:" (analogous to 2 × the frequency) as defined in zero crossings per second, zps (analogous to 2 × the c.p.s.).

Secondly, when the number of the Walsh function is expressed in binary form, the digits in the binary number are determinative of the symmetry of the function about certain axes. For example, in the case of Walsh functions of order 16, the binary representation determines the symmetry about the axes A, B, C, D, where D is positioned at ½ × the function range from the origin, C is positioned at ¼ × the function range, B is positioned at ⅛ × the function range, A is positioned at 1/16 × the function range, and so on. Thus, on a graphical representation of the functions, where the range 0-1 occupies 16 graphical units, the A axis is positioned one unit from the origin, the B axis is positioned 2 units from the origin, the C axis is positioned 4 units from the origin, and the D axis is positioned 8 units from the origin. If a numerical "1" exists in the binary number corresponding to the Walsh function of interest, the function will be conjugately symmetric about the corresponding axis. If more than one numerical "1" exists, the function will be conjugately symmetric about more than one axis. This, of course, assumes that the function extends to infinity in both directions. On the other hand, if one or more numerical "O"s exist in the binary number which corresponds to the desired Walsh function, the function will be purely symmetric about the corresponding axes. For example, and with reference to FIG. 1, the binary representation for the first Walsh function, Wal(0), is 0000. Thus, $A=0$, $B=0$, $C=0$, and $D=0$. Since there are no numerical "1"s in the binary representation of this function, Wal(0) has no conjugate symmetry but is purely symmetric about the D axis. In this trivial example it so happens that the function is also symmetric about the A, B and C axes. However, in general, leading, non-significant zeros are not considered.

Consider now the second Walsh function, wal (1), whose binary representation is, of course, 0001. Here there is a numerical "1" present in the D position. Thus, Wal(1) is conjugately symmetric about the D axis. Again, the leading "O"s are not considered. Now consider the sixth Walsh function, Wal(5), which is determined by the binary number 0101. Here, there are numerical "1"s present in the B and D positions, and a significant, numerical "0" present in the C position. Thus, Wal(5) is conjugately symmetric about both the B and the D axes, and purely symmetric about the C axis.

Another interesting phenomenon is observed if the order of the Walsh functions is rearranged, i.e., if the functions are permuted, and the values of the permuted functions arranged in an array, called the Hadamard array.

For example, for the Walsh functions of order 2, the corresponding Hadamard array is $$H_2=\begin{bmatrix}1 & 1\\ 1 & -1\end{bmatrix}$$

Observe that all quadrants of the array contain a "1" except for the lower right-hand quadrant which contains a "−1," the complement of the "1" which is contained in the other quadrants of the array. Observe Wal (0) that by reading along the first row of the array (or down the first column) one obtains the numerical sequence 1, 1, which is, of course, the value of Wal(1), the first Walsh function of order 2. Reading along the second row (or down the second column) similarly yields the sequence 1, −1, which is the value of Wal(1).

Hadamard functions of higher order are obtained by taking the Kronecker product of lower order Hadamard functions. That is to say, if $$H_2=\begin{bmatrix}1 & 1\\ 1 & -1\end{bmatrix}$$

then $$H_4=H_2\times H_2=\begin{bmatrix}1 & 1 & 1 & 1\\ 1 & -1 & 1 & -1\\ 1 & 1 & -1 & -1\\ 1 & -1 & -1 & +1\end{bmatrix}$$

Note that the Kronecker product of two lower order Hadamard arrays results in another Hadamard array in which each quadrant is identical to the lower order array except for the lower right-hand quadrant which is always the complement of the lower order array.

As before, reading along the rows (or down the columns) of the array yields the numerical sequences 1, 1, 1, 1; 1, −1, 1, −1; 1, 1, −1, −1; and 1, −1, −1, 1. These numerical sequences respectively correspond to the Walsh functions of order 4, namely Wal(0), Wal(3), Wal(1), and Wal(2). It will be observed that the order of Walsh functions which are generated by the use of a higher order Hadamard array is changed over that shown in FIG. 1. Since the order of the functions, per se, is not important, and to avoid confusion, it is advisable to rename the Walsh functions which are generated by the use of Hadamard arrays as W (0), W(1), W(2), etc., and this nomenclature will be followed throughout the rest of this discussion.

Figures 2, 3, 4:
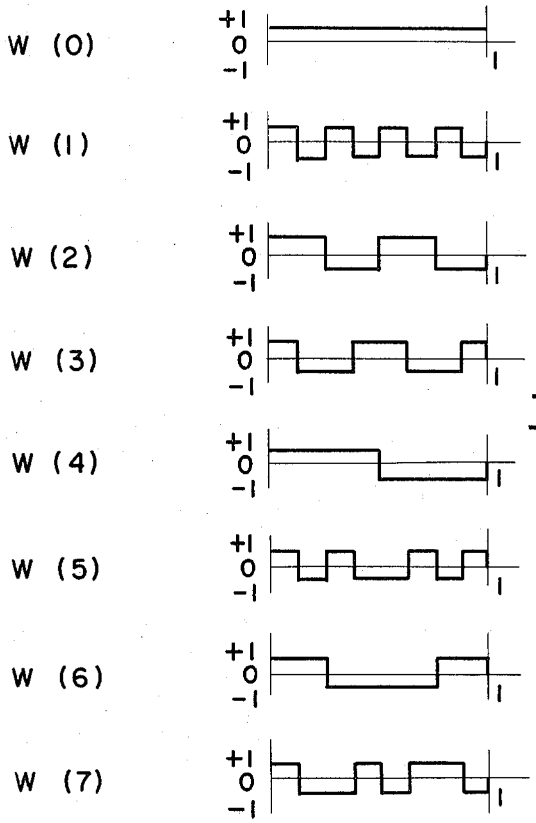
FIG. 2 depicts the Walsh functions of order 8, as generated by the methods and apparatus of this invention.
FIGS. 3 through 6 respectively represent the Hadamard arrays for generating the Walsh functions of orders 2, 4, 8, and 16, according to this invention.

FIG. 2 depicts the Walsh functions of order 8, W(0)–W(7) as obtained from such a Hadamard array. By comparing FIGS. 1 and 2, it will be observed that W(1) = Wal(7), W(2) = Wal(3), W(3) = Wal (4), and so on.

As shown in FIGS. 3 through 6, the procedure whereby a higher order Hadamard array is obtained from the Kronecker product of two lower order arrays may be reiterated, as often as need be, to produce Hadamard arrays of order 8, 16, 32, etc. In each case, the upper right, upper left, and lower left-hand quadrants are identical to the lower order Hadamard array from which the higher order array is formed, but the lower right-hand quadrant is always the complement thereof.

In FIGS. 3 through 6, the rows and columns of each array have been numbered, in binary notation, starting from the left and top of the arrays, respectively. For example, in FIG. 5, the rows and columns are numbered from 000 through 111, respectively. The location of element 21 in the array, for example, is thus uniquely determined by the binary row-column address 101, 010.

Figure 7:
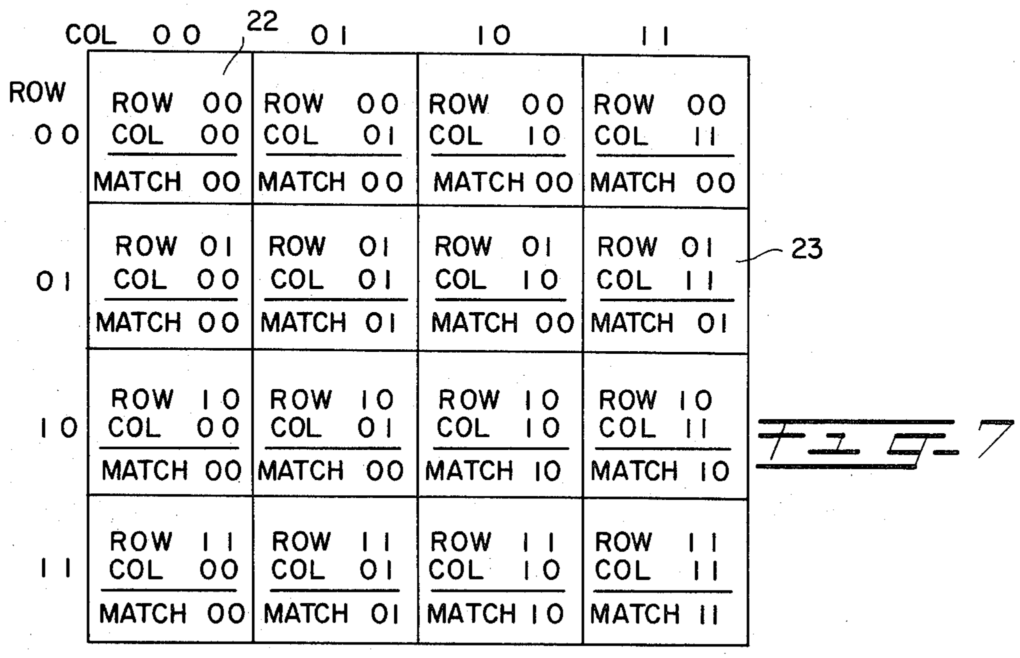
FIGS. 7 through 9 illustrate how the values for the Walsh functions of order 4 are derived from the Hadamard array of FIG. 4 according to this invention.
Figure 8:
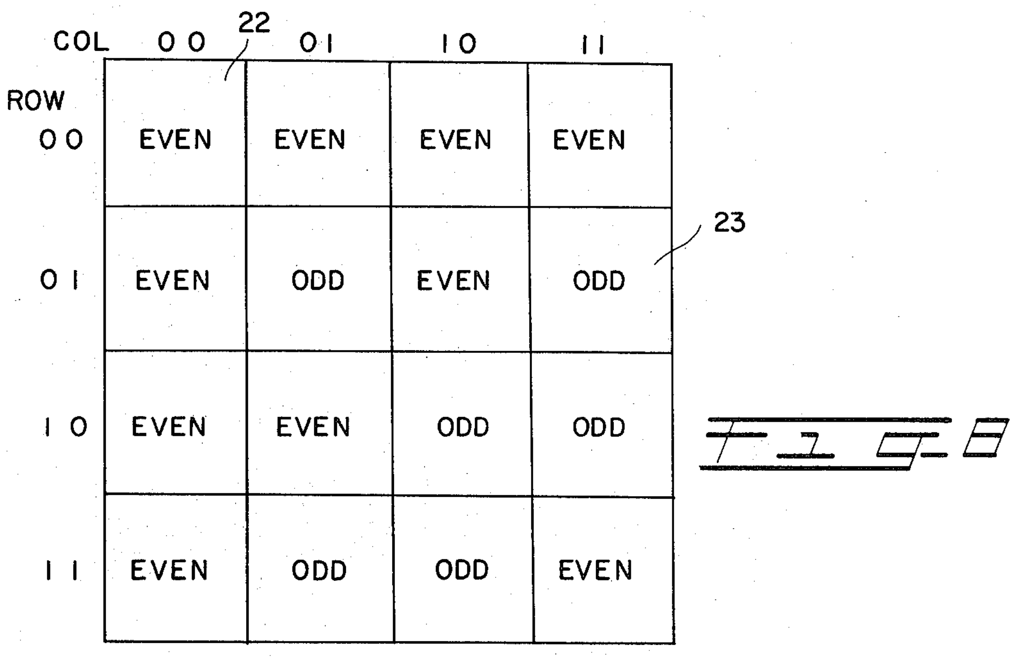
Figure 9:
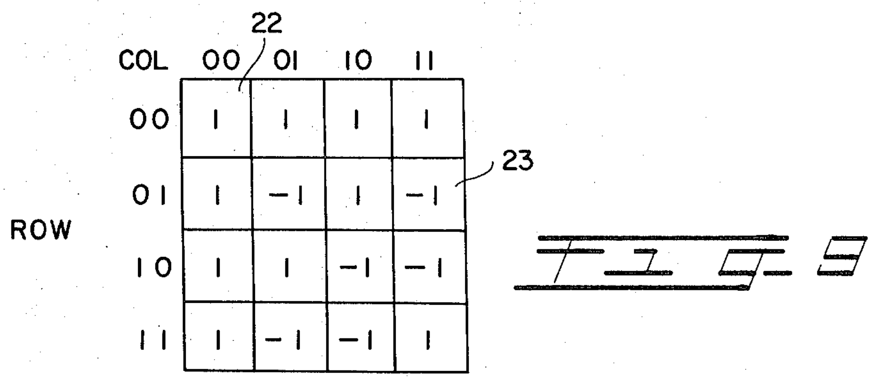

The instant invention is based on the discovery that the address of an element in a Hadamard array may be used to generate the numerical value to be assigned to that element. As shown in FIGS. 7, 8 and 9, and with reference to the Hadamard array of order 4 shown in FIG. 4, the algorithm of the instant invention proceeds by successively "ANDing" corresponding bits in the row and column address of every element along a given row of the array. For each such element, the results of the "ANDing" operation are examined to detect if the resulting binary number contains an odd or an even number of binary "1"s. If the resulting number contains an even number of "1"s, a "1" is assigned to the corresponding element in the array, but if the number contains an odd number of "1"s, a "−1" is assigned to that element of the array. For the purposes of this invention, the total absence of "1"s in the result of the "ANDing" operation is considered to be an even number. Thus 00 is even, 01 is odd, 10 is odd, 11 is even, and so on.

Consider element 22 in the 4 × 4 array of FIG. 7. The row address of element 22 is 00 and the corresponding column address is 00. "ANDing" the first (i.e., least significant) bit in the row address with the corresponding bit in the column address yields a "0." Likewise, "ANDing" the second (i.e., most significant) bit in the row address with the corresponding bit in the column address also yields a "0." As shown in FIG. 8, since the resulting number 00 is by definition an even number, a "1" is assigned to element 22 in the Hadamard array of FIG. 9.

In like manner, the row address of element 23 in FIG. 7 is "01" and the corresponding column address is "11." "ANDing" the first bit of the row address with the first bit of the column address yields a "1," whereas "ANDing" the respective second address bits yields a "0." The resulting binary number "01" contains an odd number of "1"s as indicated in FIG. 8, and thus a "−1" is assigned to element 23 in FIG. 9.

The above-described procedure can be extended to Hadamard arrays of order $2^N$. For example, consider element 24 in FIG. 6. The row address is 1011 and the column address is 0101. Thus

| | | | | |
|---|---|---|---|---|
| | 1 | 0 | 1 | 1 |
| | 0 | 1 | 0 | 1 |
| AND | 0 | 0 | 0 | 1 |

Figures 5, 6:
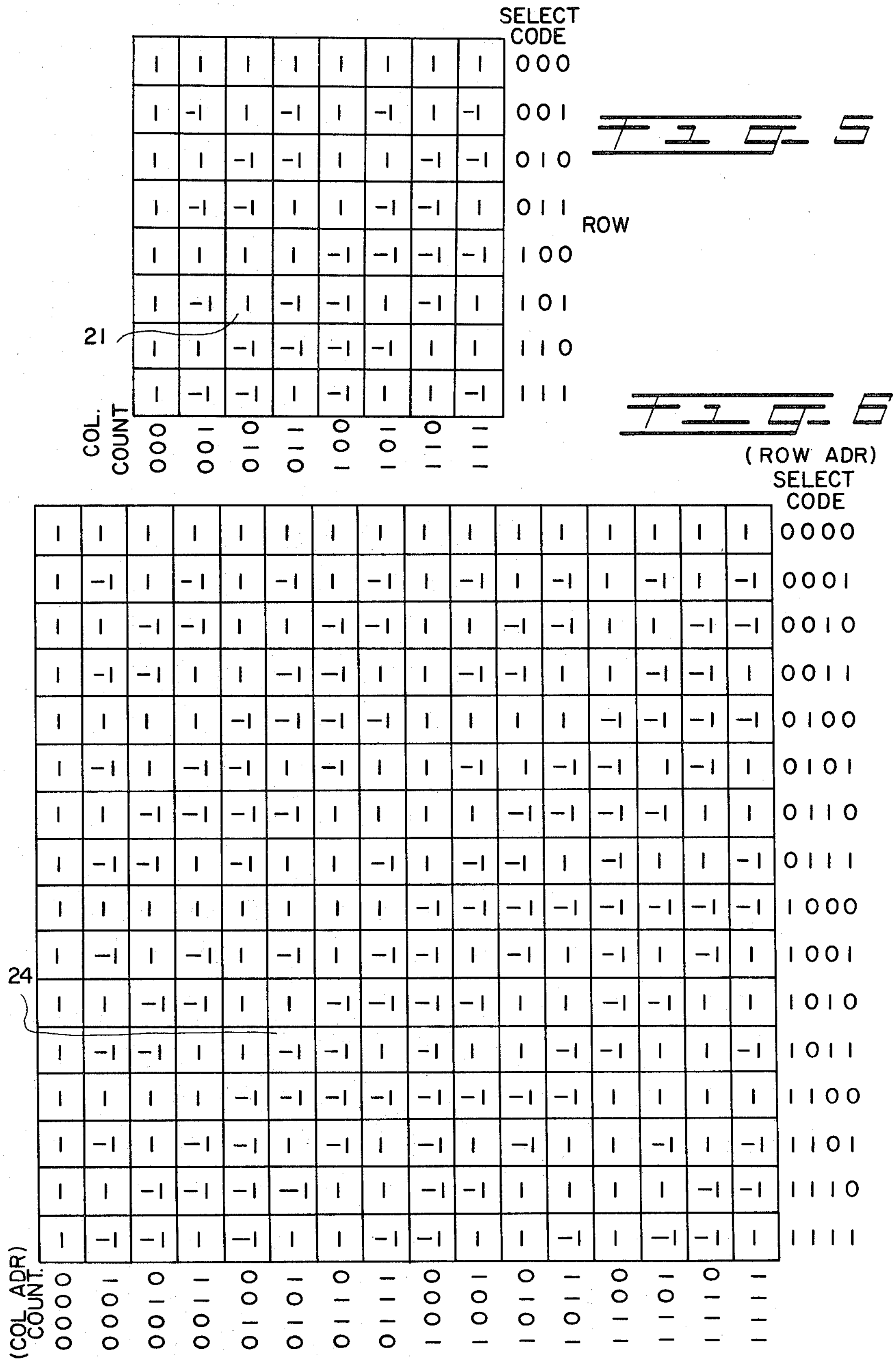

The resultant binary number 0001 contains an odd number of "1"s, therefore, element 24 should be assigned a "−1", which as can be seen from FIG. 6 is correct for this element. 2

In accordance with the above algorithm, then, a particular Walsh function of order $n$ may be generated by (a) selecting the corresponding row address in a $n \times n$ Hadamard array, (b) successively "ANDing" corresponding bits of the row and column addresses in the array, starting with the first column address, (c) determining if the number so produced contains an even or odd number of binary "1"s, and (d) assigning a "1" or a "−1" to the successive segments of the Walsh function, depending upon the results of the odd or even test. The only restriction on this procedure is that n must be some power of 2, that is to say $n = 2^p$ where $p \geq 1$.

It should be noted that, unlike prior art Walsh function generators, the desired Walsh function may be generated directly, without the time-consuming necessity of first generating lower order functions. Further, generation of the function need not necessarily start at the origin but may begin at any arbitrary column location along the given row if desired. In this latter event, the procedure could continue cyclically through the columns of the matrix until the entire Walsh function was generated. For example, in a 16 × 16 array, if generation of the function was begun at column 13, the procedure might repeat cyclically, as follows, moving to column 13, 14, . . . 15, 0, 1, . . . 12, and so on.

Figure 10:
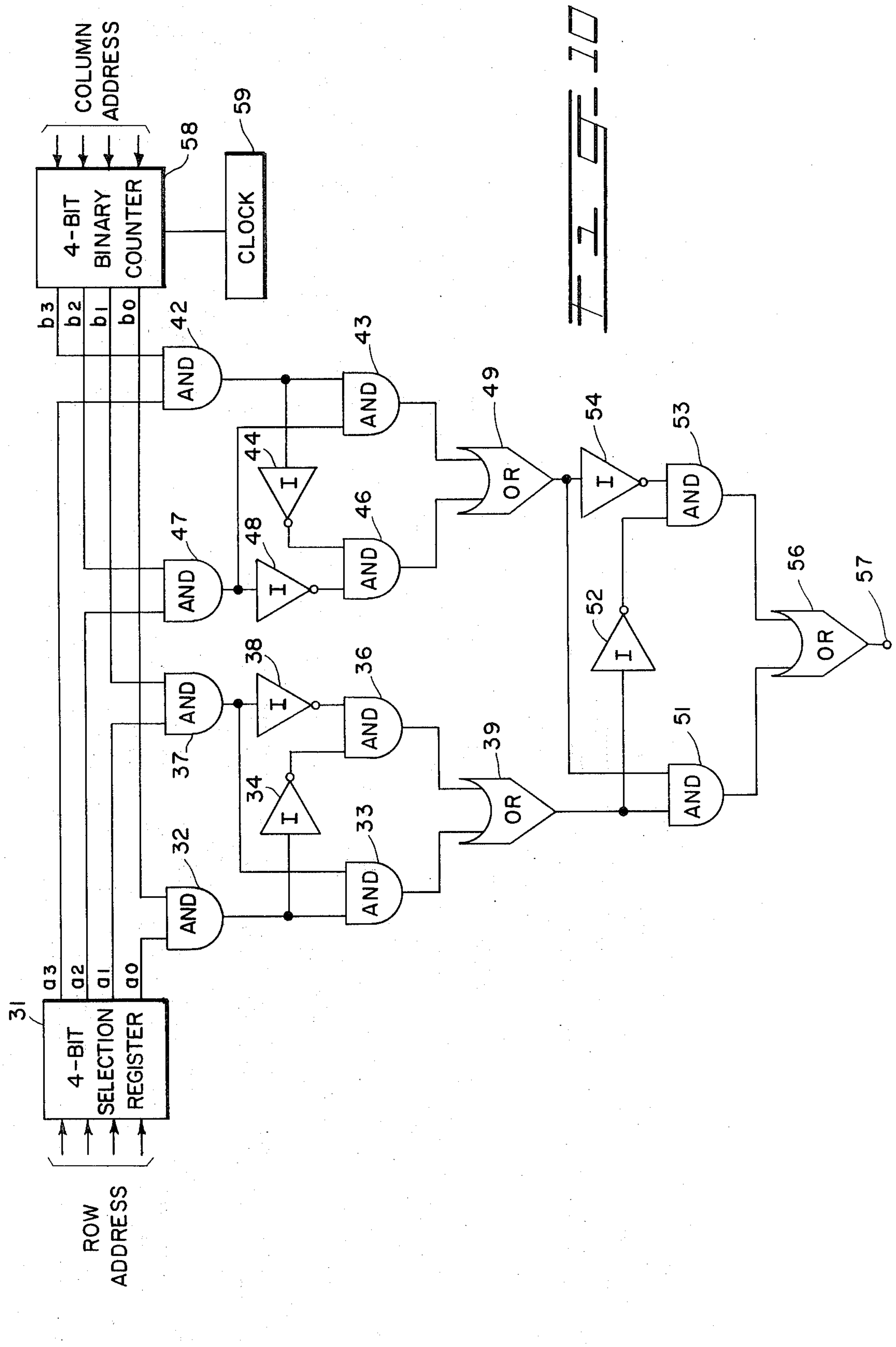
FIG. 10 is a schematic drawing which illustrates a first embodiment of the invention for generating the Walsh functions of order 4.

FIG. 10 depicts as illustrative 4-bit Walsh function generator for generating the Walsh functions of order 16, according to the invention. One skilled in the art will appreciate that in order to generate Walsh functions of order 32, 64, etc., it is merely necessary to provide additional AND, OR, and inverter stages logically interconnected to implement the algorithm of the invention. Of course, for higher order functions, the selection register and binary counter must be made sufficiently large to accommodate the increased size of the row and column addresses.

As shown, the row address of the desired Walsh function is supplied to a selection register 31 from any of several known means, for example from a generator or special purpose digital computer (not shown). Register 31, thus, stores the row address during the period in which the desired Walsh function is generated. Means, not shown, are provided to clear the register after the function has been generated.

The output ($a_0$) from the least-significant stage of register 31 is connected to one input of an AND-gate 32 whose output is connected to one input of a second AND-gate 33 and also, via an inverter 34, to one input to another AND-gate 36.

The output ($a_1$) of the second least-significant stage of register 31 is connected to one input of a fourth AND-gate 37 whose output is connected, via a second inverter 38, to the other input of AND-gate 36 and also, directly, to the other input of AND-gate 33. The output of AND-gates 33 and 36 are connected to the inputs of an OR-gate 39, as shown.

In an entirely analogous manner, the output of the next least-significant stage ($a_2$) and the output of the most significant stage ($a_3$) of register 31 are connected to AND-gates 47, 42, thence to inverters 48, 44, AND-gates 43, 46 and OR-gate 49.

The output of OR-gate 39 is connected as one input to an AND-gate 51 and, via an inverter 52, to one input of another AND-gate 53. The output of OR-gate 49 is connected, via an inverter 54, to the other input of AND-gate 53 and, directly, to the other input of AND-gate 51.

The output of AND-gates 51 and 53 are connected to the inputs of another OR-gate 56 whose output terminal 57 develops the desired Walsh function.

The remaining inputs of AND-gates 32, 37, 47 and 42 are respectively connected to the least-significant ($b_0$) through most-significant ($b_3$) outputs of a 4-bit binary counter 58 which is connected to, and driven by, a clock 59. Binary counter 58 receives initially either the address of the column in the Hadamard array at which it is desired to begin generation of the Walsh function or, as will more generally be the case, a reset signal to set all stages of the counter to "0."

The truth tables for the AND-gates and OR-gates used in the above-described embodiment of the invention are as follows:

AND-GATE TRUTH TABLEOR-GATE TRUTH TABLE

| | | | | |
|---|---|---|---|---|
| | 0 | 1 | 0 | 1 |
| 0 | 0 | 0 | 0 | 1 |
| 1 | 0 | 1 | 1 | 1 |

In operation, assume that it is desired to generate the first Walsh function, W(0) commencing at the beginning rather than at some intermediate point. The row address corresponding to W(0) is, of course, 0000 and that number is loaded into register 31. A reset signal sets the count in counter 58 to 0000. Thus, $a_0$, $b_0$; $a_1$, $b_1$; $a_2$, $b_2$; and $a_3$, $b_3$ are all "0" and the output of AND-gates 32, 37, 47 and 42 will also be "0." The "0" output from AND-gate 32 is connected to one input of AND-gate 33 and, after inversion, is fed as a "1" to one input of AND-gate 36. The "0" output of AND-gate 37 is inverted and fed as a "1" to the other input of AND-gate 36 whose output is, thus, a "1." The output of AND-gate 37 is also fed to the other input of AND-gate 33 whose output, thus, becomes a "0." Since at least one input to OR-gate 39 is a "1," the output thereof is also a "1."

In a precisely analogous manner, for the input conditions given, the output of OR-gate 49 also becomes a "1." The "1" output of OR-gate 49 is applied to one input of AND-gate 51 which receives on its other input the "1" output from OR-gate 39. Consequently, AND-gate 51 presents a "1" to OR-gate 56. The inverted outputs from OR-gates 39 and 49 are applied to AND-gate 53 whose "0" output is also fed to OR-gate 56. Since at least one input to OR-gate 56 is a "1," its output, at terminal 57, will also be a "1," which is the correct value for the first segment of the first Walsh function, W(0).

Clock 59 now increments the count in counter 58 from 0000 to 0001, thus changing the value of $b_0$ from "0" to "1." However, because $a_0$ remains "0" there will be no change in the output of AND-gate 32, hence the second segment of the first Walsh function, W(0), remains at the "1" level. It should be apparent to the reader that for W(0), the first Walsh function, the input signals $a_0 - a_3$ remain unchanged at "0," thus no change in the values of $b_0 - b_3$ can alter the output of OR-gate 56. Thus, all segments of the first Walsh function, W(0), will have the value "1," which agrees with the graphical representation thereof in FIG. 6.

Consider, now, a less trivial example, i.e., generation of the fourteenth Walsh function of order 16, W(13), beginning at some intermediate point, say column address 1001, rather than at the origin. The corresponding row address for W(13), i.e., 1101, is loaded into register 31 and the desired column address 1001 is loaded into counter 58.

Since $a_0$, $b_0$ = 1 and $a_3$, $b_3$ = 1, AND-gates 32 and 42 will both have "1" outputs. On the other hand, since $a_1$ = 0 and $b_2$ = 0, the output of AND-gates 37 and 47 will be "0." Since at least one input to each of AND-gates 33, 36, 43, and 46 is zero, the output of OR-gates 39 and 49 will also be "0." This causes the output of AND-gate 51 to be "0," but because of inverters 52 and 54, the output of AND-gate 53 will be a "1." Thus, OR-gate 56 will generate a "1," which is a correct value for this segment of the W(13) function.

Clock 59 now advances the count in counter 59 to 1010. Since $a_1$ remains at "0" this will produce no change in the output of AND-gate 37. However, the change of $b_0$ from "1" to "0" will cause the output of AND-gate 32 to change to "0" which, after inversion, will cause the output of AND-gate 36 to change to a "1." This, in turn will cause the output of OR-gate 39 to change to a "1" and, after inversion, AND-gate 53 will now generate a "0." Since both inputs to OR-gate 56 are now "0," the output of OR-gate 56 will also be a "0." It should be pointed out that the output of a Walsh function generator is normally expressed in terms of "+1" and "−1" levels. The conversion of a "0" output from OR-gate 56 to a "−1" signal may be effected in the Walsh function generator itself or in some external piece of hardware to which the generator is connected. However, if desired, the "0" signal at the output of OR-gate 56 may readily be converted into a "−1" signal, by the use of an additional gate (not shown). Thus, when the count in counter 59 is 1010, the output of the Walsh function generator is representative of a "−1," which is the correct level for the next segment of the W(13) Walsh function, as shown in FIG. 6.

Clock 59 will continue to step counter 58 along until the count therein reaches 1111, at which point counter 58 is reset and generation of the desired Walsh function is complete. As previously mentioned, if desired the count in counter 58 could be continued through 0000 to 1111 to generate a complete cycle. Further, it is also possible to arrange counter 58 so that the 0000 count is skipped entirely. In this event the output of the generator is a sequence of length $2^N-1$ and the output pattern is the Barker code.

Since the solid state logic elements used in this embodiment of the invention can switch state in a matter of nanoseconds, clock 59 may operate at rates as high as 20 mHz, or more, thereby permitting extremely fast generation of the Walsh functions. It will be noted that at no time does the circuitry of FIG. 10 generate any Walsh function other than the function of interest and that generation of the desired function may be initiated anywhere along the function and not merely at the origin, as is the case with prior art generators.

Figure 11:
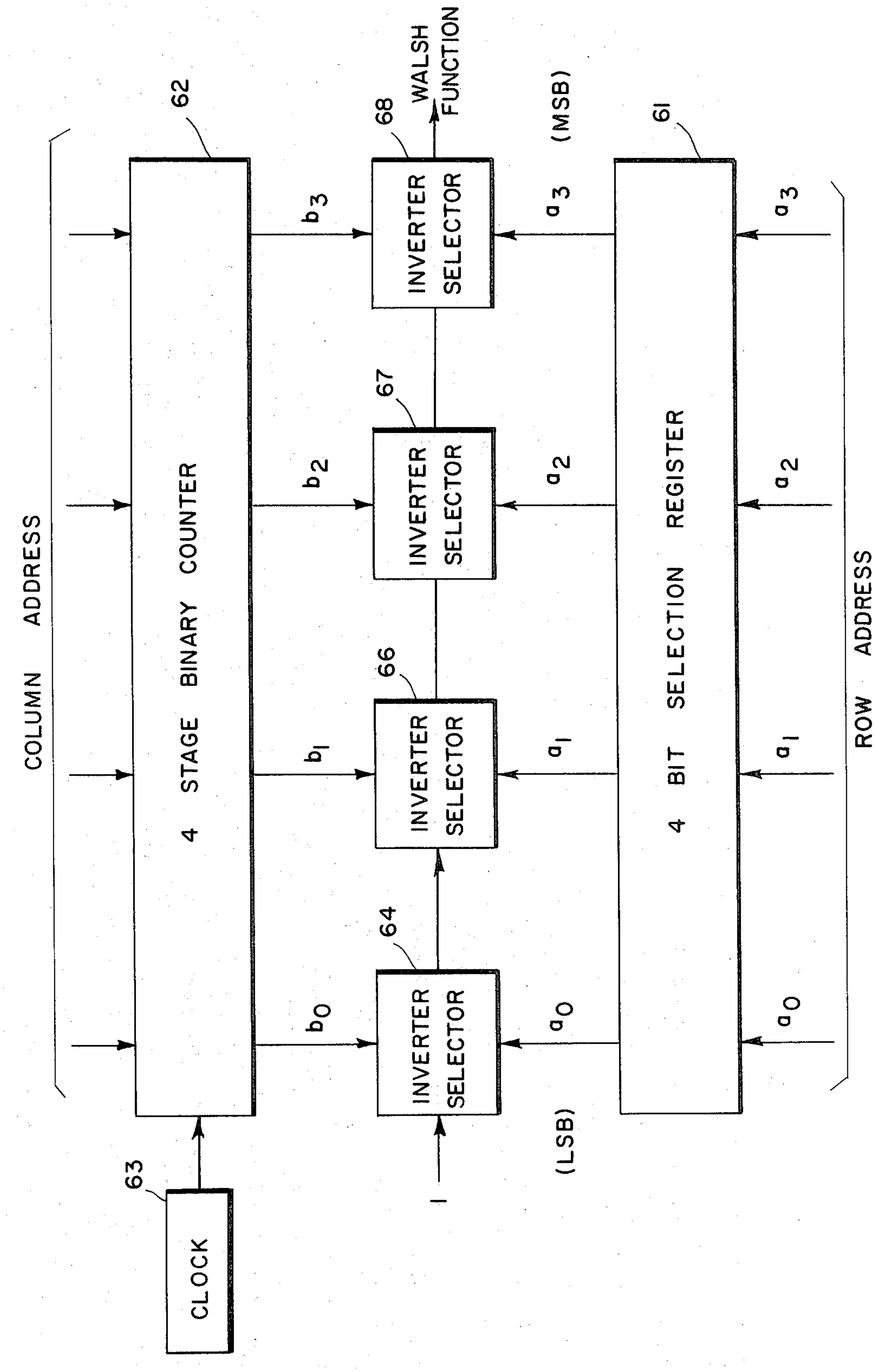
FIG. 11 is a schematic drawing which illustrates a second embodiment of the invention for generating the Walsh functions of order 4.

FIG. 11 depicts a second embodiment of the invention which may also be employed to generate Walsh functions. The particular generator shown is a four-stage generator which is, therefore, capable of generating the Walsh function of order 16. One skilled in the art will appreciate that by adding additional stages in a logical manner, higher order Walsh functions may be generated with equal facility. As shown, in this embodiment, the row address of the desired Walsh function is loaded into a 4-bit selection register 61 which is substantially identical to register 31 of FIG. 10. At the same time, a four-stage binary counter 62 connected to, and driven by, a clock 63 receives either the desired column address (if generation of the function is to begin at some intermediate point) or, as is will more generally be the case, a signal to reset the count therein to 0000.

The output of the first (i.e., least significant) stage of selection register 61, together with the corresponding output from the first stage of binary counter 62, is fed to a first inverter selector stage 64. Selector stage 64 has a "1" signal permanently connected to the input thereof. The output of inverter selector stage 64 is connected to the input of a second inverter selector stage 66 which also receives the outputs from the second stages of selection register 61 and binary counter 62. In like manner, inverter selector stages 67 and 68 are connected in cascade with stages 64 and 66 and respectively receive successively more significant outputs from selection register 61 and binary counter 62.

Each inverter selector stage is designed to complement the signal present at its input if, and only if, both the row bit and the corresponding column bit supplied to that stage are logical "1"s. The truth table for each of the inverter selector stages 64 through 68, is as follows:

| | | INPUT | |
|---|---|---|---|
| ROW | COLUMN | 0 | 1 |
| 0 | 0 | 0 | 1 |
| 0 | 1 | 0 | 1 |
| 1 | 0 | 0 | 1 |
| 1 | 1 | 1 | 0 |

Operation of the circuit shown in FIG. 11 may be explained as follows. The input to the first inverter selector stage is permanently set at "1" and this "1" signal is propagated through each of the cascaded inverter selector stages to the output, the "1" signal at the input of the generator being complemented, or not, in each cascaded stage depending upon the value of corresponding bits in the row and column addresses associated with each stage.

In operation, assume that the first Walsh function W(0) is to be generated, starting from the origin. The corresponding row address for W(0) is, of course, 0000 and this number is loaded into the four-stage register 61, binary counter 62 being reset so that the column address initially present therein is 0000. Since $a_0$ and $b_0$ are both "0," the truth table shows that the "1" signal at the input of inverter selector 64 should not be complemented. Thus, the input to selector stage 66 will be a "1."

Since for the W(0) function, $a_1$ and $b_1$ are both "0," the input signal on stage 66 will not be changed on passage through selector 66 and thus a "1" signal will also be present at the input to selector stage 67. Since $a_2$ and $b_2$ are also both "0" for W(0), the "1" signal at the input of stage 67 will be unchanged and, thus the input to final selector stage 68 will also be a "1." Because $a_3$ and $b_3$ are both "0" for W(0), the "1" signal at the input of stage 68 will be unchanged by selector 68 and the output of the generator will be a "1," which is, of course, correct for the first segment of Walsh function W(0).

Clock 63 now increments the count in counter 62 from 0000 to 0001. Thus, $b_0$ will be changed from a "0" to a "1," however, $a_0$ remains unchanged at $a_0 = 0$. As shown in the truth table, for $a_0 = 0$ and $b_0 = 1$, selector stage 64 will not complement the "1" input thereto, thus, the input to selector stage 66 remains a "1."

Since none of the $a$, $b$ input signals to selector stages 66, 67 and 68 have changed, the "1" signal present at the input selector stage 66 will propagate through all succeeding stages in the generator and the final generator output will remain a "1," which is correct for the second segment of the Walsh function, W(0).

Consider, now, generation of the 10th Walsh function, W(9), beginning at some intermediate column address, say 1100. The row address corresponding to W(9) is 1001. Thus, $a_0=1$ and $b_0=0$ and selector stage 64 will not complement is "1" input. Likewise, $a_1 = 0$ and $b_1 = 0$ and selector stage 66, in turn, will not complement the "1" signal which it receives from stage 64.

In like manner, $a_2 = 0$ and $b_2 = 1$, thus there will be no complementing in stage 68. However, both $a_3$ and $b_3$ are "1"s and, as shown in the truth table, for this combination of input signals, selector stage 68 will complement its "1" input, yielding a "0" output from the generator, which is, of course, representative of a "$-1$" level in the desired Walsh function.

Clock 63 now increments the count in counter 62 from 1100 to 1101. Thus $b_0$ will change from $b_0=0$ to $b_0 = 1$, yielding the input condition $a_0 = 1$ and $b_0 = 1$ for stage 64 which will accordingly complement its "1" input and generate a "0" output. This "0" output will propagate unchanged through selector stages 66 and 67, as in the previous example, but since the input conditions of selector stage 68 remain such as to cause this stage to complement any signal applied thereto, the final output from the generator will be a "1," which is correct for the next segment of W(9).

Figure 12:
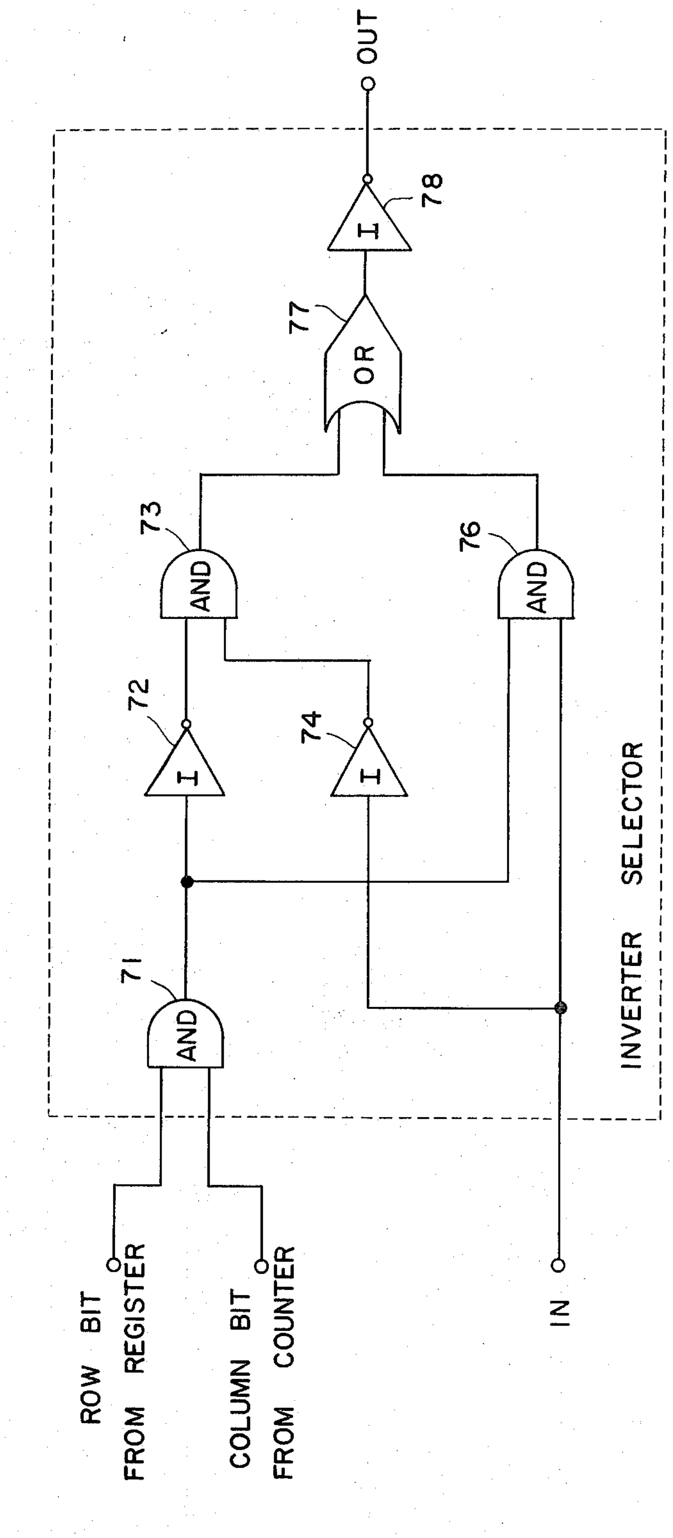
FIG. 12 is a schematic drawing illustrating a portion of the apparatus shown in FIG. 11 in greater detail.

FIG. 12 depicts the circuitry of inverter-selector stage 64 in greater detail. Selector stage 64 is, of course, identical to all other selector stages, except for the fact that a "1" signal is permanently connected to the input lead thereof. As shown, the row bit from the first stage of register 61, and the column bit from the first stage of counter 62, are connected to the inputs of an AND-gate 71 whose output is connected, via an inverter 72 to one input of a second AND-gate 73.

The input to stage 64, a permanent "1" signal in this case, is connected via an inverter 74 to the second input of AND-gate 73 and, directly, to an input of a third AND-gate 76. The other input of AND-gate 76 is connected to the output of AND-gate 71.

The outputs of AND-gates 73 and 76 are connected to an OR-gate 77 whose output is connected to an inverter 78 the output of which is the output of the selector stage.

In operation, the permanent "1" on the input lead will, after inversion, cause a permanent "0" signal to appear on one input of AND-gate 73.

Thus, one input to OR-gate 77 will permanently be a "0." Since the input signal of selector stage 64 is also connected to one input of AND-gate 76, the output of OR-gate 77 will be determined solely by the output of AND-gate 71.

Thus, only if both inputs to AND-gate 71 are "1"s, will OR-gate 77 produce a "1" output, which, after inversion produces a "0" output from the selector stage.

Any other combination of input signals to AND-gate 71 will yield a "0" output therefrom, causing the output of AND-gate 76 to become "0," causing, in turn, the output of OR-gate 77 to be a "0" and the output of inverter 78 to become a "1." In other words, the "1" signal present at the input is complemented to a "0" if, and only if, both the row bit and the column bit are simultaneously "1"s.

If the input to selector stage 68 were a "0" rather than a "1," as may happen in the other selector stages, inverter 74 would apply a "1" signal to one input of AND-gate 73. On the other hand, the output of AND-gate 76 would become a "0." Thus, if an input to AND-gate 71 is a "0," AND-gate 73 would produce a "1" signal, causing inverter 78 to produce a "0." There would thus be no complementing of the input signal.

However, as before, if both the row and column bits applied to AND-gate 71 are "1"s, AND-gate 73 will produce a "0" output, causing the output of inverter 78 to become a "1," which is, of course, the complement of the input signal.

The embodiments of the invention shown in FIGS. 10 and 11 have several characteristics in common. First, if the row selection is changed synchronously, a smooth transition to the next Walsh function is realized. Secondly, if the binary counter is structured to skip the zero count, thereby providing a sequence of length $2^N-1$, the output pattern is a Barker code. Finally, the same binary counter may be employed to simultaneously step a plurality of function generators, it being merely necessary to provide additional selection registers, comparison gates and parity trees (or inverter selectors) for each stage.

Figure 13:
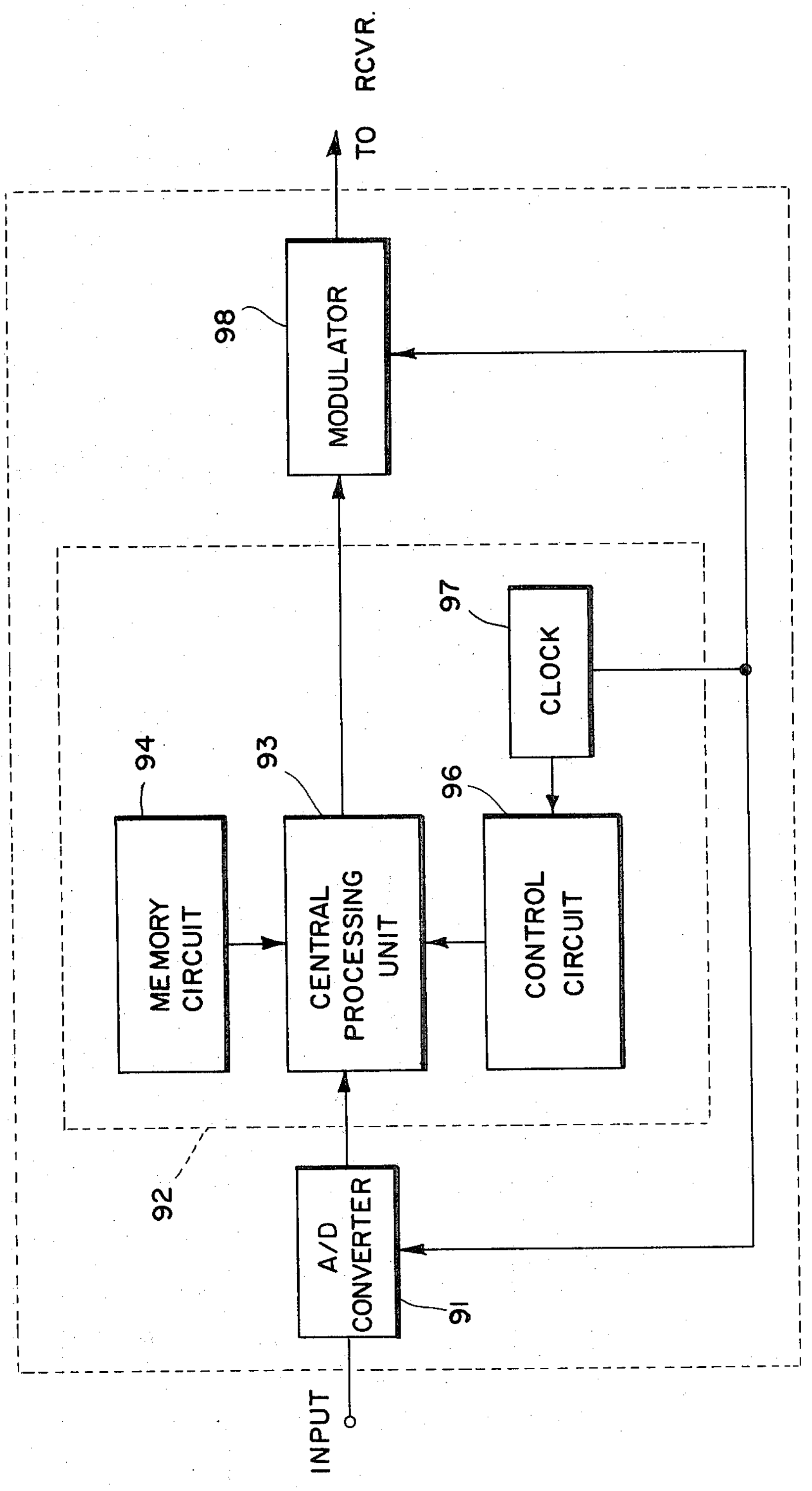
FIGS. 13 and 14 are schematic drawings of an illustrative data transmission system which may utilize the Walsh function generators of FIG. 10 or FIG. 11.
Figure 14:
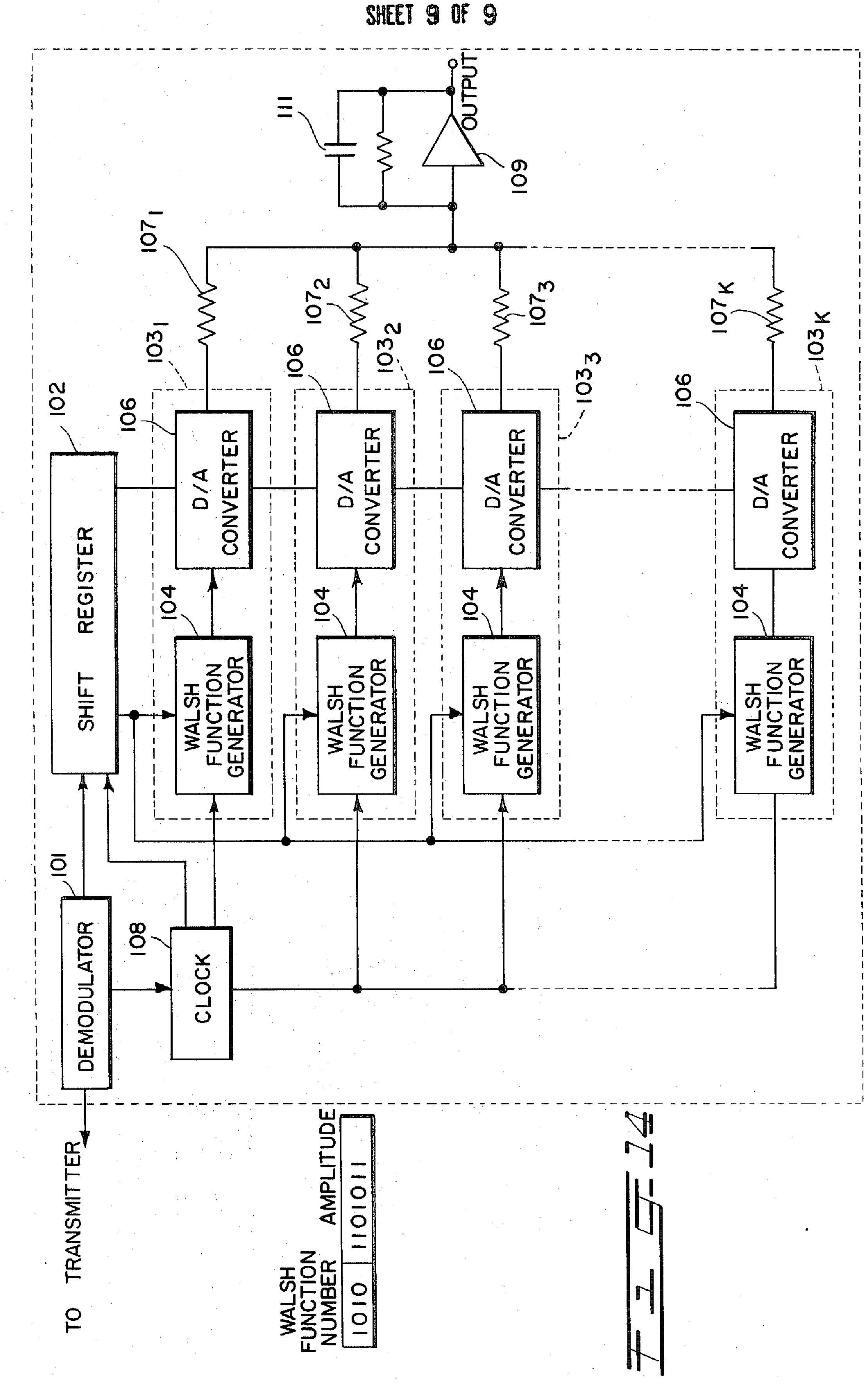

FIGS. 13 and 14 depict an adaptive bandwidth reduction system employing Walsh function generators according to this invention.

As shown in FIG. 13, the data transmitter comprises an analog-to-digital converter 91 receiving on its input the analog signal to be transmitted, for example a telephone grade voice signal extending from 300–3,000 Hz.

The output of converter 91 is connected to a digital computer 92 comprising a central processing unit 93, a memory storage circuit 94, for example a magnetic disc or drum, a control circuit 96 and a clock circuit 97. Computer 92 may comprise a large, general-purpose computer, such as an IBM 360/50 or a smaller, special-purpose computer, such as a Digital Equipment Corporation PDP-11. The output from computer 92 is connected to a modulator 98 thence, via a commercial land-line, or the like, to the digital receiver shown in FIG. 14.

In operation, the incoming audio signal is sampled at a rate determined by clock circuit 97, and converted into digital form by A/D converter 91. The digitalized signals are then fed into the central processing unit of computer 92.

Computer 92 operates under the control of programs which are stored in memory circuit 94. Among these is a program for implementing a fast Walsh transform algorithm (which is similar to the fast Fourier transform). As is well known, a signal $f(t)$ may be represented by its Fourier transform, that is to say, $$f(t)=\sum_{n=1}^{N} A_n \cos n\mu t + B_n \sin n\mu t + A_0$$

The corresponding relationship for the Walsh transform is $$f(t)=\frac{1}{N^2}\sum_{n=0}^{n-1} A_n W(n)$$

Thus, the fast Walsh transform algorithm in computer 92 will produce for each set of n samples of the audio signal a series $$f(t)=\frac{1}{N^2}\sum_{n=0}^{n-1} A_0 W(0)+A_1 W(1)+ \dots A_{n-1} W(n-1)$$

where W(0), W(1),...W(m) are the Walsh functions of order 0, 1, . . . $n-1$, and $A_0, A_1 \dots A_{n-1}$ are the respective amplitudes of those functions. Because the Walsh functions are comprised of rectangular pulses, they are rich in harmonics and because of this fact, it has been found that an acceptable signal will be recreated if only the K largest terms of the Walsh transform signal are transmitted. Accordingly, computer 92 is programmed to rank order the terms of the Walsh transform and select only the K largest terms, where K, for example, equals 10. Thus, if the Walsh transform derived by computer 92 resulted in the following series $$f(t)=\frac{1}{32^2}\sum_{n=0}^{31}(3.5W(0)+0.1W(1)+2.8W(2)+0.3W(3)+0.2W(4)+9.7W(5)\ \dots)$$

the terms 3.5W(0), 2.8W(2), 9.7W(5) would be selected for transmission and the terms 0.1W(1), 0.3W(3) and 0.2W(4) . . . being negligible, would be suppressed.

After the terms of the Walsh transform have been rank ordered, a series of data words descriptive of the selected terms are forwarded to modulator 98 for transmission to the receiver (shown in FIG. 14).

Each word comprises $p$ bits, the first $q$ of which represent, in binary notation, the number of the Walsh function and the last $r$ of which represent in binary form, the magnitude of that function.

Thus, the first term to be transmitted, 3.5W(0), might be encoded as

← p →
← q → ← r →

| | | | | | | | | | |
|---|---|---|---|---|---|---|---|---|---|
| 0 | 0 | 0 | 0 | 1 | 0 | 0 | 0 | 1 | 1 |

In like manner, the second term to be transmitted, 2.8W(2) would be encoded as

← q → ← r →

| | | | | | | | | | |
|---|---|---|---|---|---|---|---|---|---|
| 0 | 0 | 1 | 0 | 0 | 1 | 1 | 1 | 0 | 0 |

Note that the Walsh function itself is not transmitted. Only the number of the function and its relative magnitude. It is this fact that results in the significant reduction of bandwidth that this system exhibits.

Turning now to FIG. 14, the system receiver comprises a demodulator 101 connected to a shift register 102. The receiver includes K identical decoding stages $103_0 - 103_K$ each of which comprises a Walsh function generator 104, according to the invention, connected to a digital-to-analog converter 106. The output of each D/A converter 106 is connected to a summing register, thence to the input of an operational amplifier 109 having a smoothing network 111 in the feedback path thereof. A clock circuit 108, which receives synchronizing signals from demodulator 101, supplies timing signals to each of the Walsh function generators 104 and to the shift register 102.

The first $q$ stages of register 102 are connected to the Walsh function generator of decoder $103_1$ while the first $r$ stages of register 102 are connected to the D/A converter of the same decoder. In like fashion, the next $q$ stages of register 102 are connected to the Walsh function generator of decoder $102_2$, and so on.

In operation, the train of K encoded binary words is received from the distant transmitter and demodulated by demodulator 101 which also supplies a synchronized pulse to clock circuit 108. The output from demodulator 101 is connected to the input of shift register 102 which thus receives and stores the K encoded binary words transmitted from the transmitter at the distant location.

The digits of the K stored binary words are then supplied in parallel to the K decoding stages, the first q bits of each word being fed to the selector register in the corresponding Walsh function generator and the next $r$ bits being fed into the associated D/A converter.

The output from each Walsh function generator is a sequence of "1"s and "0"s (or "1"s and "−1"s), which may be considered as sign bits in that they specify the polarity of the Walsh function during the corresponding time interval. Using these signals, then, as an input to the sign bit connections of the D/A converters will result in an output which alternates between a positive and a negative signal whose amplitude is selected by the r amplitude bits in each word. For example, the first demodulation word,

| | | | | | | | | | |
|---|---|---|---|---|---|---|---|---|---|
| 0 | 0 | 0 | 0 | 1 | 0 | 0 | 0 | 1 | 0 |

which is fed to decoder stage $103_1$, will cause the Walsh function generator to generate the function W(0) and the sequence of "1"s and "0"s (or "1"s and "−1"s) so generated will be multiplied in the D/A converter by a factor of 3.5 to yield the first term of the Walsh transform, i.e., 3.5W(0).

In like manner, the second encoded word

| | | | | | | | | | |
|---|---|---|---|---|---|---|---|---|---|
| 0 | 0 | 1 | 0 | 0 | 1 | 1 | 1 | 0 | 0 |

will cause the Walsh function "anding" each bit in the binary address of the K generator of decoder stage $\mathbf{103_2}$ to generate the function W(2) while the associated D/A converter will multiply the function by a factor of 2.8 to yield the second term in the Walsh transform 2.8W(2).

In like manner, the remaining decoder stages produce the other terms of the Walsh transform, and all the terms are then summed in resistors $\mathbf{107_1}$– $\mathbf{107_K}$ and smoothed in operational amplifier 109. Thus, as additional digital encoded samples are transmitted and decoded, the output from operational amplifier 109 will be a substantially faithful reproduction of the audio signal supplied to the input of A/D converter 91 in FIG. 13, the deviation therefrom being a function of the sampling rate and the degree of bandwidth reduction (i.e., the value of K). Since the Walsh transform per se is not transmitted but only descriptions of the K largest terms therein, a significant reduction in system bandwidth is possible, possible as much as 5:1.

One skilled in the art will appreciate that if it is desired to to use TTL logic elements, rather than the standard elements shown, it is merely necessary to substitute NAND-gates and NOR-gates for the AND-gates and OR-gates shown, and to make appropriate changes in the location of the inverter stages. It will further be appreciated that, provided a consistent approach is taken, all binary "1"s could be changed to "0"s and vice versa, if this were more convenient. Various other substitutions and modifications may be made without departing from the spirit and scope of the invention.

What is claimed is:

1. A method of generating a digital signal which is representative of the $K^{th}$ Walsh function of order n, where $n = 2^p$, $p \geq 1$, and $0 \leq K \leq n-1$, comprising the steps of:

"anding" each bit in the binary address of the K row of an $n \times n$ Hadamard array of the Walsh functions of order $n$, with the corresponding bit in the binary address of the $m^{th}$ column in said array, where $0 \leq m \leq n-1$;

generating a first signal if the number of "1"s in the binary word resulting from said "anding" step is even, and a second signal if otherwise; and then reiterating said "anding" and said generating steps, seriatim, for the $m+1^{th}$, $m+2^{th}$, . . . $n-1^{th}$, $0^{th}$, . . . $m-1^{th}$ column of the array, the sequence of first and second signals so produced comprising the desired digital signal.

2. The method according to claim 1 wherein said first and second signals are respectively representative of a numerical "1" and a numerical "−1" value in said Walsh function.

3. A method of generating the $K^{th}$ Walsh function of order $n$, where $n = 2^p$, $p \geq 1$, and $0 \leq K \leq n-1$, comprising the steps of:

a. generating a first binary signal representative of the number K;

b. generating a second binary signal representative of a predetermined number m, where $0 \leq m \leq n-1$;

c. comparing each bit in said first binary signal with the corresponding bit in said second binary signal, thereby to generate a third binary signal, said third binary signal having a first signal condition in each bit position if the bits in the corresponding bit positions of said first and second binary signals are simultaneously "1"s and a second signal condition if otherwise;

d. counting the number of first signal conditions in said third binary signal;

e. generating a fourth binary signal, comprising a third signal condition if the number of first signal conditions counted in said counting step is even, and a fourth signal condition if otherwise; and then f. reiterating steps (b) through (e), seriatim, for the numbers $m+1$, $m+2$, . . . , $n-1$, 0, . . . , $m-1$, the sequence of fourth binary signals so produced comprising the desired Walsh function.

4. The method according to claim 3 wherein said first, second, third and fourth signal conditions respectively comprise a 1, 0, 1, and −1 signal.

5. A method of generating a digital signal which is representative of the $K^{th}$ Walsh function of order $n$, where $n = 2^p$, $p \geq 1$, $0 \leq K \leq n-1$, comprising the steps of:

a. generating a first $p$ bit binary signal representative of the number K;

b. generating a second p bit binary signal representative of a number $m$, where $0 \leq m \leq n-1$;

c. generating a third signal representative of a first binary signal condition;

d. for each of the $p$ bit positions in said $p$ bit binary signals, sequentially complementing said third signal to cause said signal to become representative of a second binary signal condition or said first binary signal condition, if the bits occupying corresponding bit positions in said first and second binary signals both simultaneously comprise a third binary condition, and maintaining said third signal constant if otherwise;

e. reiterating steps (b) through (d), seriatim, for the numbers $m+1$, $m+2$, . . . , $n-1$, 0, 1, . . . , $m-1$, the sequence of sequentially complemented third signals so produced comprising the desired Walsh function.

6. The method according to claim 5 wherein said first and second binary signal conditions respectively comprise a numerical "1" and a numerical "−1," respectively, and said third binary condition comprises a "1."

7. A method of transmitting an intelligence signal from a first to a second location, comprising the steps of: at said first locations, a. periodically sampling said intelligence signal at a predetermined rate;
b. generating an $n$ term Walsh transform for each periodic sample of said intelligence signal;
c. selecting the $K$ largest terms of said $n$ term Walsh transform, where $K \leq n$; and
d. transmitting to said second location signals which are representative of the magnitude and Walsh function number of each of said $K$ largest terms; and at said second location, a. generating a Walsh function for each of said K largest terms, the number of said function being determined by the corresponding Walsh function number signal received from said first location;
b. multiplying said Walsh function by a factor which is proportional to the corresponding magnitude signal received from said first location; and
c. summing said $K$ multiplied Walsh functions to substantially reconstruct each periodic set of samples of said intelligence signal, whereby said intelligence signal itself may be substantially reconstructed at said second location by detecting successive ones of said periodic samples.

8. The method according to claim 7 wherein said transmitting step comprises:

simultaneously generating K discrete $p$ bit binary words, each word including $q$ bits which are representative of the number of a corresponding Walsh function, and $r$ bits which are representative of the magnitude of said function;

assembling said K discrete binary words into a train; and encoding said train for serial transmission to said second location.

9. The method according to claim 7 further comprising, at said second location, decoding said train of K encoded binary words, as they are received from said first location;

storing said words in a shift register until the K word has been fully decoded; and then feeding the K groups of $p$ bits stored in said register, in parallel, to K Walsh function generators, thereby to generate said K Walsh functions, and feeding the K groups of $r$ bits to K digital-to-analog converters, each receiving the output of a corresponding Walsh function generator, thereby to multiply said K Walsh functions by factors which are proportional to the magnitude of said K largest terms.

10. Apparatus for generating the $K^{th}$ Walsh function of order $n$, where $n = 2^p$, $p \geq 1$, $0 \leq K \leq n-1$, which comprises:

$p$ cascaded, conditional-complementing stages, the output of each stage comprising the input to the immediately succeeding stage;

means for supplying a first binary signal condition to the input of the first conditional-complementing stage, the output from the last such stage comprising the desired Walsh function;

means for supplying a first p bit binary signal representative of the number K to said conditional-complementing stages, the least significant through most significant bits of said signal being respectively connected to the first through last ones of said conditional-complementing stages;

means for supplying a second p bit binary signal to said conditional-complementing stages, said signal being representative of a predetermined number $m$, where $0 \leq m \leq n-1$, the least significant through most significant bits of said signal being respectively connected to the first through last ones of said stages, each said stage complementing the signal applied to the input thereof if the corresponding bits from said first and second signal supplying means both simultaneously comprise a second binary signal condition; and means, connected to said second signal supplying means, for incrementing said second binary signal so that it successively represents the numbers $m+1$, $m+2, \ldots, n-1, 0, 1, \ldots, m-1$, whereby the output from the last one of said complementing stages comprises a desired Walsh function.

11. Apparatus according to claim 10 wherein said first signal supplying means comprises:

a $p$ stage register, said register receiving the first binary signal from an external source, the output from each stage of said register being connected to a corresponding conditional-complementing stage;

said second signal supplying means comprises a $p$ stage binary counter, the output from each stage thereof being connected to a corresponding conditional-complementing stage; and means, connected to said binary counter, for establishing an initial count therein representative of the predetermined number $m$.

12. Apparatus according to claim 11 wherein said incrementing means comprises a clock circuit connected to said binary counter for successively advancing the count stored therein.

13. Apparatus for generating the $K^{th}$ Walsh function of order $n$, where $n = 2^p$, $p \geq 1$, $0 \leq K \leq n-1$, which comprises:

means for supplying a first $p$ bit binary signal representative of the number K;

means for supplying a second $p$ bit binary signal representative of a predetermined number $m$, where $0 \leq m \leq n-1$;

means, connected to said first and second signal supplying means, for comparing each of the $p$ bit positions in said first binary signal with a corresponding one of the $p$ bit positions in said second binary signal to generate a first binary signal condition for each such comparison wherein the corresponding bit positions both simultaneously comprise a second binary signal condition, and a third binary signal condition if otherwise;

means, connected to said comparing means, for counting the number of first binary signal conditions so generated and for generating a fourth binary signal condition if said count is even, and a sixth binary signal condition if otherwise; and means, connected to said second signal supplying means, for causing said second signal to successively represent the numbers $m+1, m+2, \ldots n-1, 0, 1, \ldots 1\ m-1$, whereby the sequence of third and fourth binary signal conditions comprises the desired Walsh function.

14. The apparatus according to claim 13 wherein said first and second binary signal conditions are logical "1"s said third binary signal condition is a logical 0, said fourth binary signal condition is a numerical 1, and said fifth binary signal condition is a numerical −1.

15. The apparatus according to claim 13 wherein said first signal supplying means comprises a register receiving said first *p* bit binary signal from an external source;

said second signal supplying means comprises a *p* bit binary counter storing in each stage thereof respective bits in said second binary signal;

said comparing means comprises:

*p*/2 comparing stages, each stage including first and seond AND-gates, said first AND-gate having its input connected to a predetermined stage of said register, and the corresponding stage of said counter, said second AND-gate having its input correspondingly connected to the next most significant stages of said register and counter;

third and fourth AND-gates, said third AND-gate having its input connected to the outputs of said first and second AND-gates, said fourth AND-gate having its inputs connected, via first and second inverter stages, to the outputs of said first and second AND-gates; and a first OR-gate connected to the outputs of said third and fourth AND-gates; and for each pair of comparing stages, a fifth and sixth AND-gate, said fifth AND-gate having its inputs connected to the outputs of the two first OR-gates in said pair of comparing stages, said sixth AND-gate having its inputs connected, via a third and a fourth inverter stage, to the outputs of said pair of first OR-gates; and a second OR-gate having its inputs connected to the output of said fifth and sixth AND-gates.

16. A transmission system for transmitting intelligence signals from a first to a second location which comprises:

means for periodically sampling the analog signal to be transmitted to the second location, at a predetermined rate;

means for converting each such sample into a digital signal;

computing means for generating an n term Walsh transform representative of each of said *n* samples, and for selecting the *K* largest of said *n* terms; and means for transmitting to said second location a signal which is representative of the magnitude and Walsh function number of each of the *K* terms in each of said *n* periodic samples; and at said second location, means for recovering the signals transmitted by the transmitting means at said first location;

a shift register connected to said recovering means for temporarily storing said signals, as received, until a signal representative of a complete sample has been stored;

K Walsh function generators connected to said shift register for generating K Walsh functions in accordance with the signals representative of the Walsh function numbers of each of said K terms transmitted from said first location;

K converter stages connected to corresponding ones of said K Walsh function generators, and to said shift register, for amplifying the outputs of the Walsh function generators in accordance with the signals representative of the magnitude of each of said K transforms transmitted from said first location and for converting said amplified Walsh functions into analog form; and means for summing the outputs of each of said K converter stages thereby to substantially reconstruct each of said samples.

17. The system according to claim 16 wherein each of said $K^{th}$ Walsh function generators comprises the Walsh function generator claimed in claim 13.

18. The system according to claim 16 wherein each of said $K^{th}$ Walsh function generators comprises the Walsh function generator claimed in claim 10.

19. A receiver for use at a receiving loaction in a transmission system of the type which transmits intelligence signals from a transmitting location to the receiving location, the transmitting location, including means for periodically sampling the analog signal to be transmitted to the receiving location, at a predetermined rate;

means for converting each such sample into a digital signal;

computing means for generating an *n* term Walsh transform representative of each of said *n* samples, and for selecting the K largest of said *n* terms; and means for transmitting to said receiving location a signal which is representative of the magnitude and Walsh function number of each of the K terms in each of said n periodic samples, wherein the receiver comprises:

means for recovering the signals transmitted by the transmitting means at said first location;

a shift register connected to said recovering means for temporarily storing said signals, as received, until a signal representative of a complete sample has been stored;

K Walsh function generators connected to said shift register for generating K Walsh functions in accordance with the signals representative of the Walsh function numbers of each of said K terms transmitted from said transmitting location;

K converter stages connected to corresponding ones of said K Walsh function generators, and to said shift register, for amplifying the outputs of the Walsh function generators in accordance with the signals representative of the magnitude of each of said K transforms transmitted from said transmitting location and for converting said amplified Walsh functions into analog form; and means for summing the outputs of each of said K converter stages thereby to substantially reconstruct each of said samples.

20. The receiver according to claim 19 wherein each of said K Walsh function generators comprises the Walsh function generator claimed in claim 13.

21. The receiver according to claim 19 wherein each of said K Walsh function generators comprises the Walsh function generator claimed in claim 10.

* * * * *

L-566-PT
(6-69)

UNITED STATES PATENT OFFICE
CERTIFICATE OF CORRECTION

Patent No. 3,795,864 Dated March 5, 1974

Inventor(s) JAMES M. FULLTON

It is certified that error appears in the above-identified patent and that said Letters Patent are hereby corrected as shown below:

In the references, "Digital 325/38 R" should read --Digital Walsh--.

In the specification, column 4, line 49, "Wai(0)" should read --Wal(0)--. Column 5, line 30, "wal(1)." should read --Wal(1),--; line 40, "and" should read --and--; lines 57-58, "Wal(0)" should read --also--; line 60, "Wal(1)" should read --Wal(0)--. Column 7, line 35, "element.2" should read --element.--. Column 8, line 7, "generator" should read --general--; lines 52-55, "AND-GATE TRUTH TABLEOR-GATE TRUTH TABLE

| | | | | | |
|---|---|---|---|---|---|
| | 0 | 1 | 0 | 1 | |
| 0 | 0 | 0 | 0 | 0 | 1 |
| 1 | 0 | 1 | 1 | 1 | 1 " |

should read

--AND-GATE TRUTH TABLE

| | 0 | 1 |
|---|---|---|
| 0 | 0 | 0 |
| 1 | 0 | 1 |

OR-GATE TRUTH TABLE

| | 0 | 1 |
|---|---|---|
| 0 | 0 | 1 |
| 1 | 1 | 1 |

--.

Column 14, line 10, "number" should read --number--; line 12, "magnitude" should read --magnitude--; line 32, "number" should read --number--; line 42, "register" should read --resistor--; line 53, "$102_2$" should read --$103_2$--. Column 15, line 41, "possible" (second occurrence) should read --possibly--.

L-566-PT
(6-69)

UNITED STATES PATENT OFFICE
CERTIFICATE OF CORRECTION

Patent No. 3,795,864 Dated March 5, 1974

Inventor(s) JAMES M. FULLTON

It is certified that error appears in the above-identified patent and that said Letters Patent are hereby corrected as shown below:

In the claims, column 16, last line, claim 7, "locations" should read --location--. Column 18, line 61, claim 13, "lm-l" should read --m-l--. Column 19, line 36, claim 16, after "comprises:", insert, --at said first location,--; line 48, claim 16, "second" should read --receiving--. Column 20, line 36, claim 19, "first" should read --transmitting--.

Signed and sealed this 8th day of October 1974.

(SEAL)
Attest:

McCOY M. GIBSON JR.
Attesting Officer

C. MARSHALL DANN
Commissioner of Patents